J. H. Wait,
Governor.

№ 51,764.   Patented Dec. 26, 1865.

Witnesses:
Jas. W. Newman
Geo. A. Newman

Inventor:
John H. Wait.

UNITED STATES PATENT OFFICE.

JOHN H. WAIT, OF PORTSMOUTH, OHIO.

IMPROVEMENT IN STEAM-ENGINE GOVERNORS.

Specification forming part of Letters Patent No. 51,764, dated December 26, 1865.

*To all whom it may concern:*

Be it known that I, JOHN H. WAIT, of the city of Portsmouth, in the county of Scioto and State of Ohio, have invented an Improved Governor for Steam-Engines; and I do hereby declare the following to be a full, clear, and exact description of the same, reference being had to the accompanying drawings, which make part of this specification, and in which—

Figure 1:
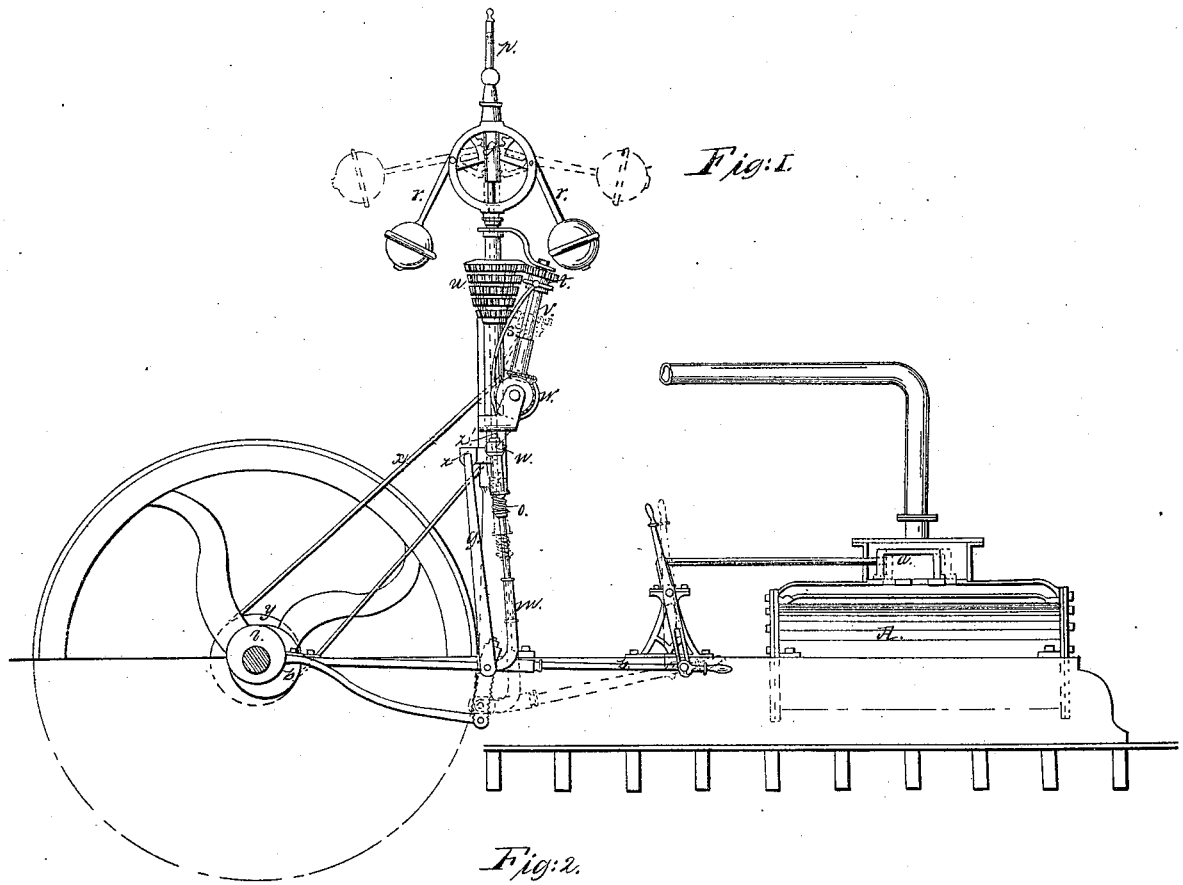
Figure 2:
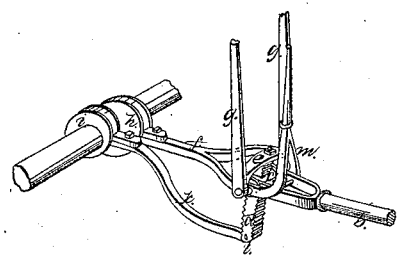
Figure 3:
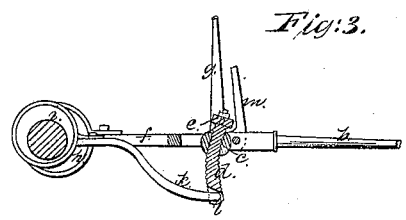

Figure 1 is an elevation of an engine with my improvement applied. Fig. 2 is a detached view of the regulating-bar hereinafter described and its connections. Fig. 3 is a side view of the parts shown in Fig. 2, partly in section.

My invention relates to a novel combination and arrangement of devices, the operation of which permits the flow of steam to the cylinder to be so regulated as to insure a uniform speed in the motion of the machinery.

In order that others skilled in the art to which my invention appertains may be enabled to fully understand and use the same, I will proceed to describe its construction and operation with reference to the accompanying drawings.

A is the cylinder of an ordinary steam-engine, in the steam-chest of which is the valve $a$, which regulates the supply of steam to the cylinder. The valve $a$ is connected with the rod $b$ by the usual rod, crank-shaft, and lever, so that a horizontal reciprocatory motion will be communicated from one rod to the other. The rod $b$ is pivoted to a movable box, $c$, which is notched upon its two inner faces, as shown, so that it may readily take hold of the notched pendulous bar $d$, which passes through said box $c$. The bar $d$ is attached at its upper end to a yoke, $e$, which is pivoted at its extremities to a rod, $f$, and vibrating bars $g\ g$. The rod $f$ is connected with a cam, $h$, upon the driving-shaft.

The notched pendulous bar $d$ is connected with a cam, $i$, upon the main shaft by means of a rod, $k$. This rod $k$ is pivoted to the lower end of the pendulous bar $d$ at $l$.

To the movable box $c$ is pivoted a rod, $m$; the upper end of which plays freely in the stirrup $n$. The rod $m$ is pressed upward by a spiral spring, $o$. To the cross-bar at the upper end of the stirrup is attached centrally the vertical rod $p$, toothed at the point $q$, so as to be operated by the governors $r\ r$.

Attached to the cross-bar at the upper end of the stirrup $n$ are two rods, $s\ s$, secured by by means of nuts. The upper ends of the rods $s\ s$ are made fast to the pinion $t$, which is adapted to engage the conical series of cog-wheels $u\ u$. The pinion $t$ plays freely up and down upon the feathered shaft $v$, which through suitable gearing receives motion from the pulley $w$. Motion is transmitted from the main shaft through the belt $x$, which passes around the pulleys $w\ y$. The vibrating bars $g\ g$ swing in an adjustable frame, $z$, secured stationarily in any desired position to the post $z'$.

Operation: While the machinery is working at low speed the governors $r$, during their revolution, droop or hang low, as shown in black, Fig. 1. The movable box $c$ stands at a high point on the notched pendulous bar $d$, which, bringing the cam-rod $f$ and rod $b$ in line, gives the greatest play to the steam-valve $a$. The faster the engine runs the higher the governors $r$ rise, depressing, through the medium of the rods $m\ p\ s$, the movable box $c$, which places the rod $b$ more nearly in line with the cam-rod $k$, and since the cam-rod $k$ is attached to a smaller eccentric, $i$, than is the cam-rod $f$, a very small play of the valve $a$ is produced. Under the depressed condition of the box $c$ the position of the several parts is represented in red in Fig. 1. Hence it is manifest that the proximity of the box $c$ to the rod $f$ or to the rod $k$ determines the extent of movement of the valve $a$, for when the box $c$ is near the lower end of the pendulous bar $d$ extent of motion of the box $c$, and hence of the rod $b$, corresponds with that of the rod $k$, which, being connected to the smaller cam $i$, has a more limited movement than the rod $f$, which is connected to the larger cam $h$.

Having thus described my invention, the following is what I claim as new herein and desire to secure by Letters Patent:

1. The combination and arrangement of the rod $b$, movable box $c$, notched pendulous bar $d$, rods $f$ and $k$, and cams $h\ i$, substantially as and for the purpose explained.

2. The combination and arrangement of the governors $r\ r$, series of cogs $u\ u\ u$, stirrup $n$, spiral spring $o$, and rod $m$, as and for the purpose set forth.

JOHN H. WAIT.

Attest:
JAS. W. NEUMAN,
GEO. O. NEUMAN.